(12) United States Patent
Redman et al.

(10) Patent No.: US 7,675,610 B2
(45) Date of Patent: Mar. 9, 2010

(54) PHOTON COUNTING, CHIRPED AM LADAR SYSTEM AND RELATED METHODS

(75) Inventors: Brian Redman, Lafayette, CO (US); William C. Ruff, Catonsville, MD (US); Barry L. Stann, Edgewater, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 353 days.

(21) Appl. No.: 11/789,114

(22) Filed: Apr. 5, 2007

(65) Prior Publication Data

US 2008/0246944 A1    Oct. 9, 2008

(51) Int. Cl.
*G01C 3/08* (2006.01)
(52) U.S. Cl. ............... 356/5.03; 356/4.01; 356/4.1; 356/5.01; 356/5.1
(58) Field of Classification Search ....... 356/3.01–3.15, 356/4.01–4.1, 5.01–5.15, 6–22, 28, 28.5
See application file for complete search history.

(56) References Cited

U.S. PATENT DOCUMENTS

| 4,161,732 | A | * | 7/1979 | Longuemare, Jr. | 342/201 |
| 4,735,507 | A | * | 4/1988 | Crane et al. | 356/491 |
| 5,754,280 | A | * | 5/1998 | Kato et al. | 356/3.06 |
| 5,877,851 | A | * | 3/1999 | Stann et al. | 356/5.09 |
| 2007/0182949 | A1 | * | 8/2007 | Niclass | 356/3 |

* cited by examiner

*Primary Examiner*—Khoi Tran
*Assistant Examiner*—Luke D Ratcliffe
(74) *Attorney, Agent, or Firm*—Edward L. Stolarun; Alan I. Kalb

(57) ABSTRACT

Ladar systems and methods are provided. One embodiment is a ladar system comprising: a chirp generator for generating a chirped waveform; a laser for transmitting a light signal toward a target, the light signal being modulated by the chirped waveform; and a photon-counting sensor for receiving a temporally-modulated photon stream corresponding to the modulated light signal being reflected from the target and toward the ladar system, the photon-counting sensor gated relative to the chirped waveform.

3 Claims, 5 Drawing Sheets

PHOTON COUNTING, CHIRPED AM LADAR SYSTEM AND RELATED METHODS

GOVERNMENT INTEREST

The invention described herein may be manufactured, used, and licensed by or for the United States Government.

BACKGROUND

1. Technical Field

The invention generally relates to laser detection and ranging.

2. Description of the Related Art

Currently, there are a number of systems for performing laser detection and ranging (LADAR). Typically, the photocurrent from the detector of a LADAR system is amplified with a high-gain amplifier because the power of the received light signal and the resulting output current of the LADAR receiver is relatively small (e.g., sub-nanoamp currents). The use of high-gain amplifiers, however, may be problematic because of resulting noise. For instance, in a LADAR system, the noise resulting from the high-gain amplifier may limit the sensitivity of the LADAR receiver.

One existing solution for overcoming amplifier noise is to use a high-gain detector, such as an avalanche photodiode (APD). APDs, however, may also introduce excess noise into the LADAR system. When modulating the APD gain to produce photonic-mixing, as required for the chirped amplitude modulation (AM) LADAR technique, the modulated excess noise may produce large amounts of self-clutter. Some chirped AM LADAR systems have reduced this problem by using metal-semiconductor-metal (MSM) photonic-mixing detectors. Such systems have been effective for 3-D imagery and have improved the self-clutter problem, but with only near unity gain, so that the receiver is amplifier-noise limited.

Some pulsed time-of-flight LADAR systems employ photon counting detectors such as high gain photomultiplier tubes (PMT), high gain microchannel plate (MCP) based image intensifier tubes, intensified photodiodes (IPD), or Geiger-mode APDs to overcome the excess APD noise and amplifier noise. For example, when operated with a reverse bias voltage above the breakdown voltage, a Geiger-mode APD outputs a large pulse upon single carrier excitation (e.g., single photon detection or dark noise carrier excitation). Typical gains in these types of LADAR receivers, for example, are more satisfactory. However, there is the additional problem that the output pulse voltage/current level is not related to the received optical power level in Geiger mode operation. Since range information is carried on the modulation of the optical power level in chirped AM LADARs, photon counting detectors have not previously been used as detectors for chirped AM LADARs.

SUMMARY

Photon counting chirped amplitude modulation (AM) laser detection and ranging (LADAR) systems and related methods are provided. One embodiment is a ladar system comprising: a chirp generator for generating a chirped waveform; a laser for producing a light signal; a means for modulating the laser light's power level with the chirped waveform; an optical system for transmitting the modulated light signal toward a target; a receiver optical system for collecting the modulated light reflected from the target and directing this modulated light onto a photon counting sensor; a gating voltage power supply producing a chirped, rectangular voltage waveform synchronous with the transmitter's chirped AM waveform and applied to the photon counting sensor's bias voltage; and a means for determining the intermediate frequency (IF) output of the photon counting sensor resulting from the mixing between the received light's photon arrival rate modulation, which is synchronous with chirped AM waveform, and the photon counting sensor's chirped AM bias voltage waveform.

Another embodiment is a ladar system comprising: a chirp generator for generating a chirped waveform; a laser for producing a light signal; a means for modulating the laser light's power level with the chirped waveform; an optical system for transmitting the modulated light signal toward a target; a receiver optical system for collecting the modulated light reflected from the target and directing this modulated light onto a high gain photon-to-electron converter, such as a photocathode with a MCP, or a photonic mixing detector (PMD), such as a metal-semiconductor-metal (MSM) opto-electronic (OE) mixing detector, operated in electron-bombarded mode; a means of modulating the responsivity or gain of the receiver with a voltage waveform that is synchronous with the transmitter's chirped AM waveform; and a means for determining the intermediate frequency (IF) output of the photon counting sensor resulting from the mixing between the received light's photon arrival rate modulation, and the photon counting sensor's chirped AM voltage waveform.

Another embodiment is a ladar system comprising: a chirp generator for generating a chirped waveform; a laser for producing a light signal; a means for modulating the laser light's power level with the chirped waveform; an optical system for transmitting the modulated light signal toward a target; a receiver optical system for collecting the modulated light reflected from the target and directing this modulated light onto a high gain photon-to-electron converter, such as a photocathode with a MCP; a photonic mixing detector (PMD), such as a metal-semiconductor-metal (MSM) opto-electronic (OE) mixing detector, operated in electron-bombarded mode with its bias voltage modulated by a voltage waveform that is synchronous with the transmitter's chirped AM waveform; and a means for determining the intermediate frequency (IF) output of the PMD resulting from the mixing between the electrons' arrival rate modulation, which is synchronous with chirped AM waveform, and the PMD's chirped AM bias voltage waveform.

Another embodiment is a ladar system comprising: means for generating a chirped waveform; means for transmitting a light signal toward a target, the light signal being modulated by the chirped waveform; means for receiving a temporally-modulated photon stream corresponding to the modulated light signal being reflected from the target and toward the ladar system; and means for gating the receiving means relative to the chirped waveform.

Another embodiment is a ladar system comprising: a chirp generator for generating a chirped waveform; a laser for producing a light signal; a means for modulating the laser light's power level with the chirped waveform; an optical system for transmitting the modulated light signal toward a target; a receiver optical system for collecting the modulated light reflected from the target and directing this modulated light onto a high gain photon-to-electron-to-photon converter, such as a photocathode with an MCP and a phosphor screen; and a photonic mixing detector (PMD), such as a metal-semiconductor-metal (MSM) detector.

A further embodiment is a ladar method comprising: modulating a light signal by a chirped waveform; transmitting the light signal toward a target; receiving a temporally-modulated photon stream corresponding to the modulated light signal being reflected from the target and toward the ladar system; and determining an intermediate frequency between the chirped waveform and the temporally-modulated photon stream.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale. Moreover, in the drawings, like reference numerals designate corresponding parts throughout the several views.

DETAILED DESCRIPTION

Figure 1:
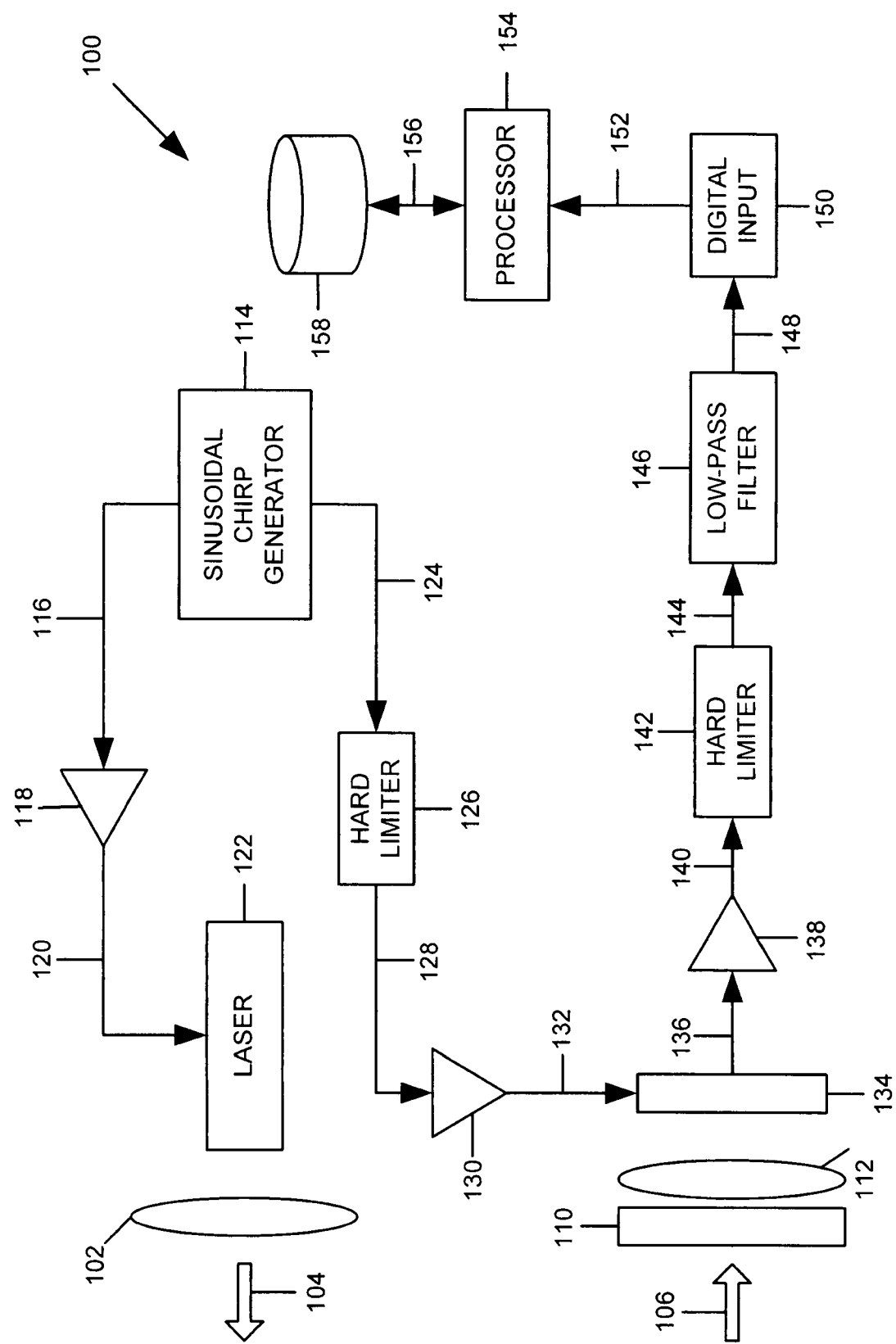
FIG. 1 is a block diagram of an embodiment of a photon counting chirped AM laser detection and ranging (LADAR) system.

This disclosure relates to various embodiments of photon counting chirped AM laser detection and ranging (LADAR) systems and related methods. Several embodiments are described below with reference to FIGS. 1-6.

In general, an exemplary embodiment of a LADAR system operates by modulating the intensity/power of a light signal with a chirped waveform with a known time-dependent frequency variation and transmitting the modulated light signal toward a target. A portion of the transmitted laser intensity may be reflected from the target back toward the LADAR system and received by a photon-counting sensor. The received light signal, which contains the original transmitted laser intensity modulation, is delayed in time due to travel along the path from the transmitter to the target and back to the receiver.

The LADAR system measures various target attributes (e.g., range, reflectance, velocity, etc.) using the received light signal. As mentioned above, the modulation on the received light signal reflected from the target is a delayed version of the modulation of the transmitted signal. In order to extract ranging information from the received light signal, the LADAR system determines an intermediate frequency (IF) waveform (i.e., offset frequency, beat frequency, or difference frequency). As used herein, an "intermediate frequency" is a difference frequency produced by the multiplicative mixing of the transmitted light's modulation waveform with the received light's modulation waveform because the transmitted light's modulation waveform is at a different frequency than that of the received light's modulation waveform at any given instant due to the round-trip delay time to the target and back, and/or due to the target's line-of-sight velocity.

It is well known that the intensity of light is proportional to the mean arrival rate of the photons (at a detector) comprising the light. Therefore, modulation of the light intensity correspondingly modulates the mean arrival rate of the photons comprising the light. Herein we refer to a stream of photons with a time varying mean arrival rate proportional to a time varying intensity modulation waveform as a temporally-modulated photon stream The chirped AM LADAR system determines the intermediate frequency by mixing the temporally-modulated photon stream (corresponding to the received light signal) with the modulation from waveform that was applied to the original transmitted light signal. As mentioned above, the transmitted light signal's intensity/power is modulated with a waveform having a known frequency variation with time. For example, the power of the transmitted light signal may be modulated with a sinusoidal waveform having a frequency that is linearly swept over a defined bandwidth. Therefore, the mean temporal density of photon arrivals at the receiver follows this modulation. In order to detect the intermediate frequency (due to the round-trip delay time between the LADAR system and the target) between the modulation of the received photon arrival rate and the waveform used to modulate the transmitted signal, the two signals are mixed together by applying a gating (i.e., on/off) voltage waveform, which is synchronous with the waveform used to modulate the transmitted signal, to the bias voltage of the photon counting sensor.

The mixing of the transmitted modulation waveform with the sinusoidal temporal density of photon arrivals via the gating action (synchronous with due to the transmitted modulation waveform) of the photon-counting sensor produces a sinusoidal modulation of the temporal density of signal photo-electrons at the intermediate frequency between the two signals.

An embodiment of a photon counting, chirped AM LADAR system 100 will now be described with reference to FIG. 1. As illustrated in FIG. 1, LADAR system 100 transmits a light signal (arrow 104) toward a target and receives a portion (arrow 106) of the light signal reflected from the target. In general, LADAR system 100 comprises a waveform generator (e.g., sinusoidal chirp generator 114), a laser 122, transmission optics 102, reception optics 112, and a photon-counting sensor 134. The waveform generator produces a signal to be used as the laser modulation and the local oscillator gating signal for photon-counting sensor 134. For example, in some embodiments, the waveform generator comprises a sinusoidal chirp generator 114 that produces a chirped signal with a frequency that increases linearly as a function of time over a period of time, T. The chirped signal is provided to a wideband RF power amplifier 118 via connection 116. The amplified signal is provided to a laser 122 via connection 120. In some embodiments, a LADAR system 100 may include a matching circuit that matches the driving impedance of amplifier 118 to the impedance of laser 122.

Laser 122 converts the chirped signal into a light waveform with power proportional to the driving current. The divergent laser light beam emitted by laser 122 is collected by transmission optics 102, collimated, and directed toward a target (as indicated by arrow 104). The portion of transmitted light that is reflected by the target and propagated back (arrow 106) to LADAR system 100 is collected by reception optics 112 and focused onto the active detection region of photon-counting sensor 134. As illustrated in FIG. 1, some embodiments of LADAR system 100 can include optional optical elements, such as a solar filter 110.

Photon-counting sensor 134 comprises a single photon-counting sensor array although, in other embodiments, various other numbers and types of photon-counting sensors may be used. For example, any of the following, or other types of photon-counting sensors may be used: a Geiger-mode avalanche photodiode(s) (APD); high-gain photomultiplier tube(s) (PMT); high-gain microchannel plate (MCP)-based image intensifier tube(s); intensified photodiode(s) (IPD).

Referring to the embodiment in FIG. 1, when switched on (i.e., gated on), the photon-counting sensor 134 converts an incident photon into a large current or voltage pulse. The mean arrival time of the photons and therefore, of the photon counting sensor's output current/voltage pulses when gated on, is proportional to the incident light's power.

As described in more detail below, photon-counting sensor 134 is switched on/off, (i.e., gated on/off), via a signal received from chirp generator 114 via connections 124, 128, and 132. The gating of the photon counting sensor 134 by the chirp signal from chirp generator 114, via connections 124, 128, and 132, effectively multiplies the stream of photons detected by photon counting sensor 134 by a rectangular waveform version of the chirp waveform. Since the mean arrival rate of the stream of photons is modulated with a delayed version of the modulation waveform applied to the power of the transmitted light, the modulation of the photon stream's mean arrival rate is at the frequency that the chirp modulation waveform had when the light was emitted. This frequency differs from that of the chirp waveform applied to gate the photon counting sensor 134 at the time of the arrival of the photons at the photon counting sensor 134 due to the round-trip delay time to and from the target. Therefore, the product of this multiplication process, also known as mixing process, contains a signal oscillating at a frequency, called the intermediate frequency, that is the difference between the frequency of the gating chirped waveform and the photon mean arrival rate modulation chirped waveform. The product of this mixing process also contains a signal oscillating at a frequency corresponding to the sum of the frequency of the gating chirped waveform and the photon mean arrival rate modulation chirped waveform. This sum frequency signal is eliminated by low pass filter 146.

Output current/voltage from photon-counting sensor 134 is provided to an amplifier 138 via connection 136. Amplifier 138 converts the sequence of output current/voltage pulses into a sequence of high amplitude voltage pulses.

Various numbers and types of amplifiers can be used. For example, in some embodiments, a wideband, trans-impedance amplifier can be used. The amplified voltage waveform pulses may be provided to hard limiter 142. The output of hard limiter 142 is provided to lowpass filter 146 to pass the intermediate frequency signal while blocking the sum frequency signal sequence of output current/voltage pulses into a sequence of high amplitude voltage pulses.

The intermediate frequency signal is converted into digital form via an A/D converter (digital input 150) and further processed via processor 154. In this regard, LADAR system 100 includes memory 158 which contains various hardware, firmware and/or software for controlling the processing of the digitized intermediate frequency signal.

It should be noted that the output waveform of photon-counting sensor 134 may be processed in a variety of ways. Therefore, in alternative embodiments of LADAR system 100, additional components may be present. Furthermore, some components illustrated in FIG. 1 may be substituted for others and/or removed from LADAR system 100.

Having described the general components of LADAR system 100 of FIG. 1, the operation and/or control of photon-counting sensor 134 will be described in more detail. As mentioned above, LADAR system 100 determines the intermediate frequency by mixing the temporally-modulated photon stream (arrow 106) with the original transmitted light signal (arrow 104). The light signal transmitted by laser 122 is modulated with the waveform produced by chirp generator 114 (e.g., a sinusoidal waveform having a frequency that is linearly swept over a wide bandwidth). The temporal density of photon arrivals at reception optics 112, therefore, follows this modulation. In order to detect the intermediate frequency (due to the round-trip delay time between the LADAR system and the target) between the modulation of the received photon arrival rate and the waveform used to modulate the transmitted signal, the two signals are mixed together.

The intermediate frequency between the transmitted waveform and the received signal may be determined by gating (e.g., turning on/off) photon-counting sensor 134 relative to the modulation waveform of the chirp waveform produced by chirp generator 114. In some embodiments, photon-counting sensor 134 is gated on and off by a rectangular voltage waveform having a frequency synchronized to the chirped sinusoidal amplitude modulation of the signal produced by chirp generator 114. As illustrated in the embodiment of FIG. 1, a rectangular local oscillator (LO) waveform is obtained by passing a portion of the chirp waveform from chirp generator 114 to a hard limiter via connection 124. The resulting waveform is provided to an amplifier 130 via connection 128. The amplified waveform is provided to photon-counting sensor 134 via connection 132.

Figure 2:
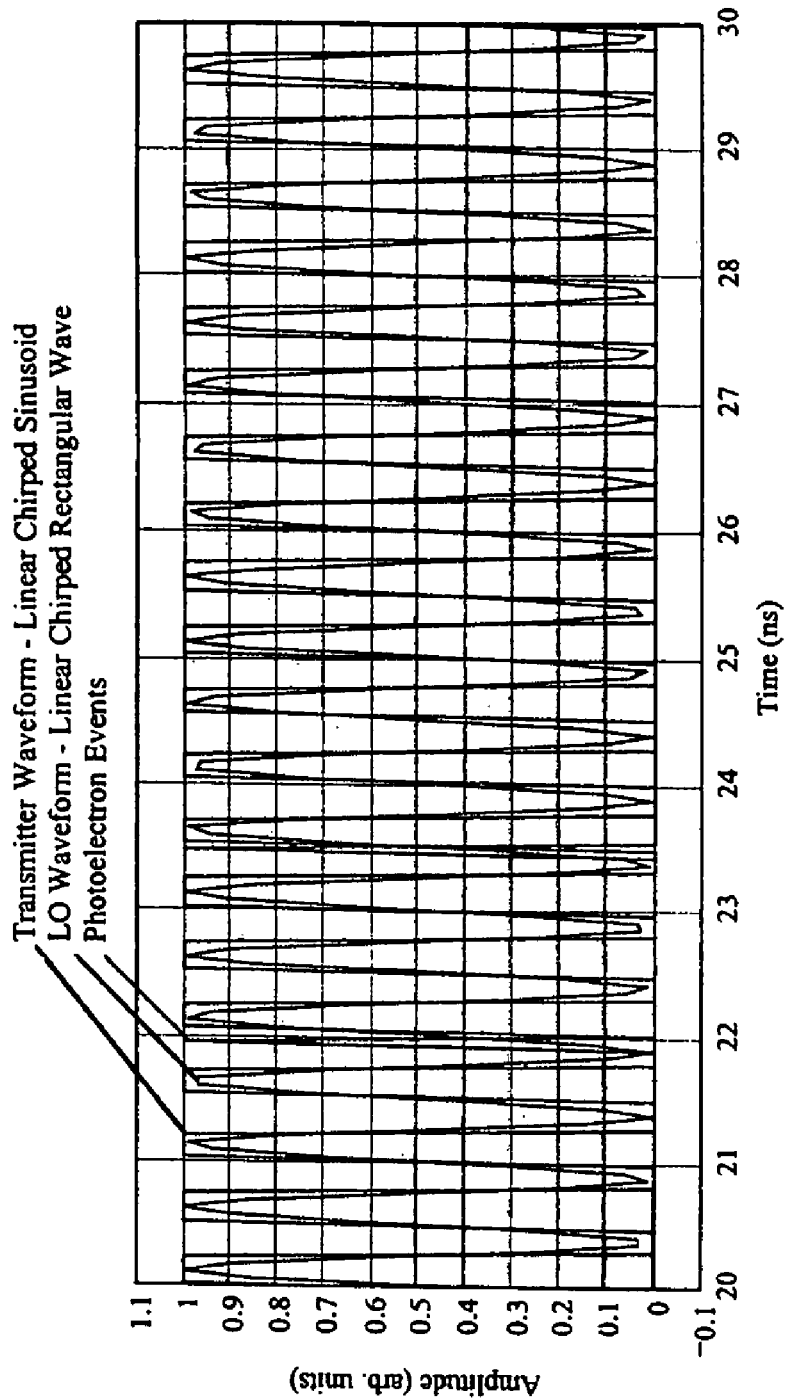
FIG. 2 is a graph illustrating amplitude vs. time of various exemplary signals in a simulation of the LADAR system of FIG. 1.

The gating voltage waveform functions as a radio frequency (RF) local oscillator (LO), and the gating of photon-counting sensor 134 by this waveform provides the mixing of the RF LO with the temporal density of photon arrivals. As an example, FIG. 2 illustrates a simulation graph of the transmitter chirped sinusoid waveform, the chirped rectangular waveform, and Poisson-distributed photon events as functions of time. This LO voltage waveform may be used to gate a variety of photon-counting sensors, such as Geiger-mode APDs, high-gain MCP image intensifier tubes, IPDs, and PMTs.

Figure 3:
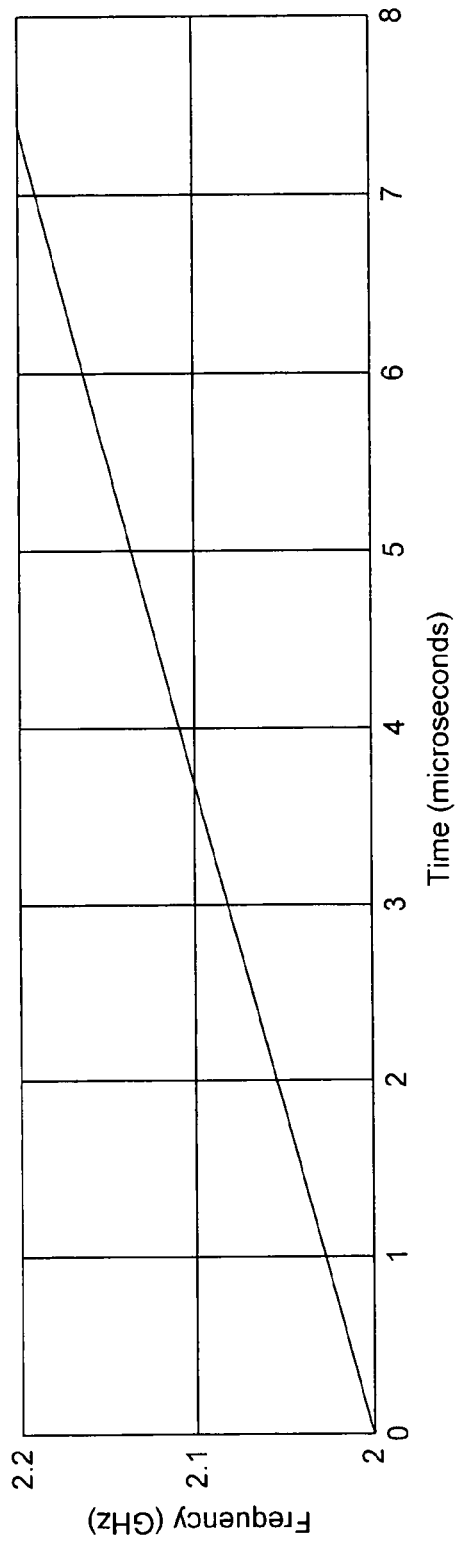
FIG. 3 is a graph illustrating frequency vs. time of an embodiment of a linear chirped waveform in a simulation of the LADAR system of FIG. 1.

FIG. 3 illustrates the frequency of the chirped signal as a function of time. It should be appreciated that a variety of alternative waveforms (for both the generator waveform and the RF LO waveform) may be implemented in LADAR system 100.

Figure 4:
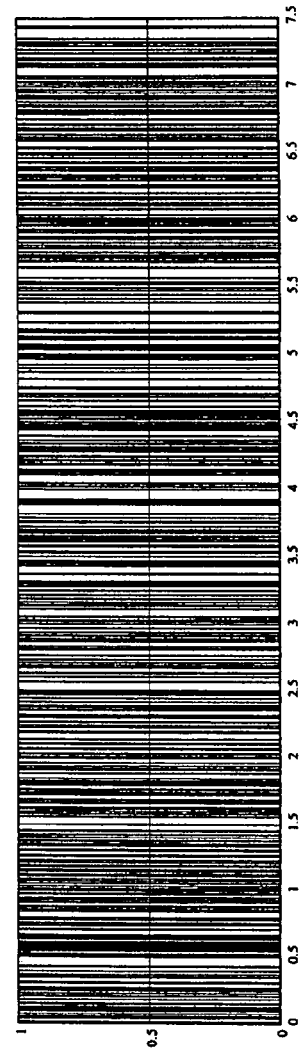
FIG. 4 is a graph illustrating photon detection rate in a simulation of the LADAR system of FIG. 1.

The mixing of the chirped rectangular RF LO with the chirped sinusoidal temporal density of photon arrivals via the gating action of the LO waveform on photon-counting sensor 134 produces a sinusoidal modulation of the temporal density of signal photo-electrons at the difference frequency (i.e., intermediate frequency (IF)) between the RF LO and the received signal. In this regard, FIG. 4 illustrates a simulation graph of the Poisson-distributed single photo-electron events of FIG. 2 produced by the RF LO mixing with the received signal. As mentioned above, the sinusoidal variation in the photo-electron temporal density may be further detected by bandpass filtering the IF frequency (filter 146) and calculating the magnitude spectrum of the filtered signal via processor 154.

Figure 5:
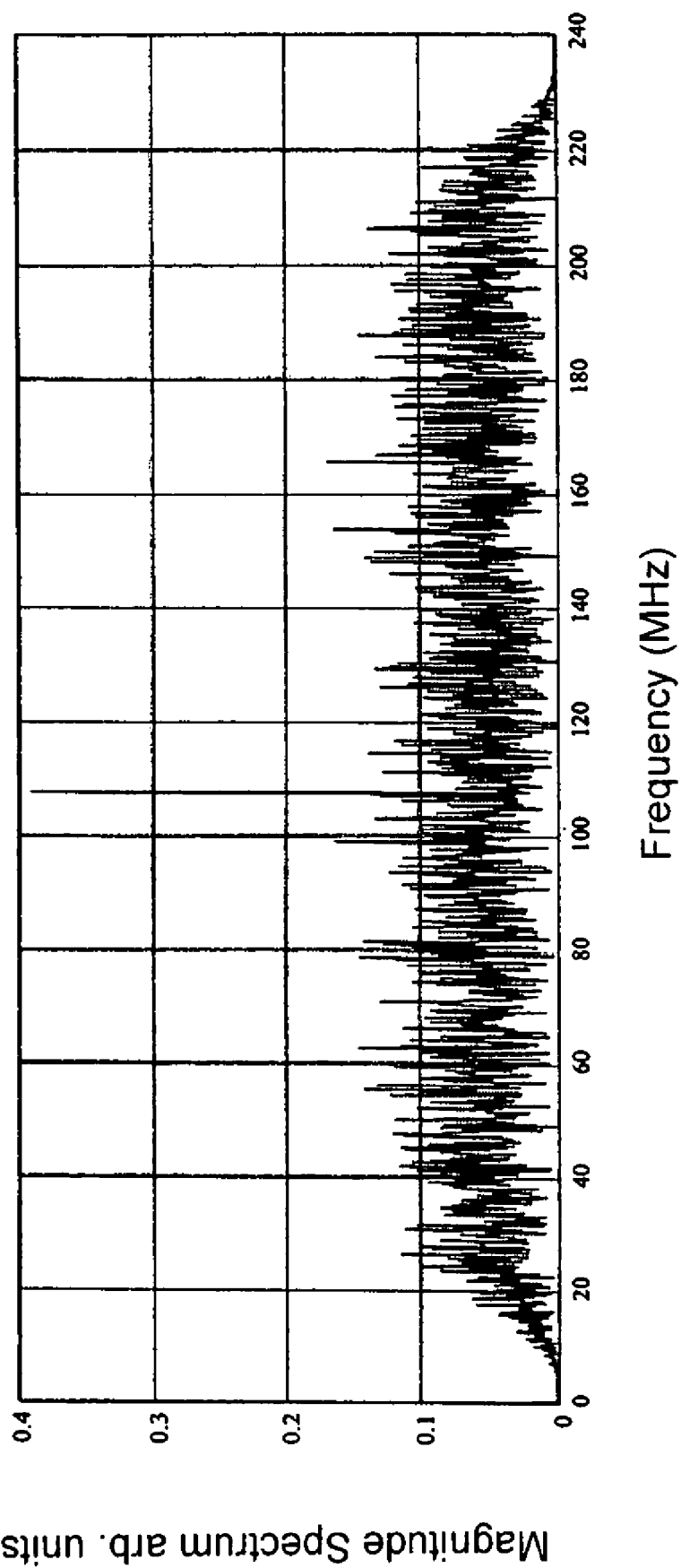
FIG. 5 is a graph illustrating the signal of FIG. 4 after filtering.

FIG. 5 illustrates the magnitude spectrum of the simulated signal shown in FIG. 4 after filtering. In this simulation, the signal-to-noise ratio (SNR), which is computed from the simulated magnitude spectrum as the ration ratio of the peak signal level to the standard deviation of the noise in the magnitude spectrum, is 13.1. The simulated SNR is nearly equivalent to the expected theoretical SNR of 15.9, calculated from a total number of photo-electron counts of 1017 with the SNR equal to the square root of the total number of photo-electron counts divided by two. The division by two accounts for the loss due to the fact that the receiver is gated off 50% of the time, which accounts for a factor of $2^{1/2}$ loss in the magnitude spectrum's SNR, and due to not detecting both the in-phase (I) and quadrature (Q) signals, which accounts for the other factor of $2^{1/2}$ loss in the magnitude spectrum's SNR. Detecting both the I and Q signals would require two detectors per pixel.

It should be appreciated that, in alternative embodiments of LADAR system 100, a two-detection-per-pixel configuration with I and Q detection channels may be implemented.

Figure 6:
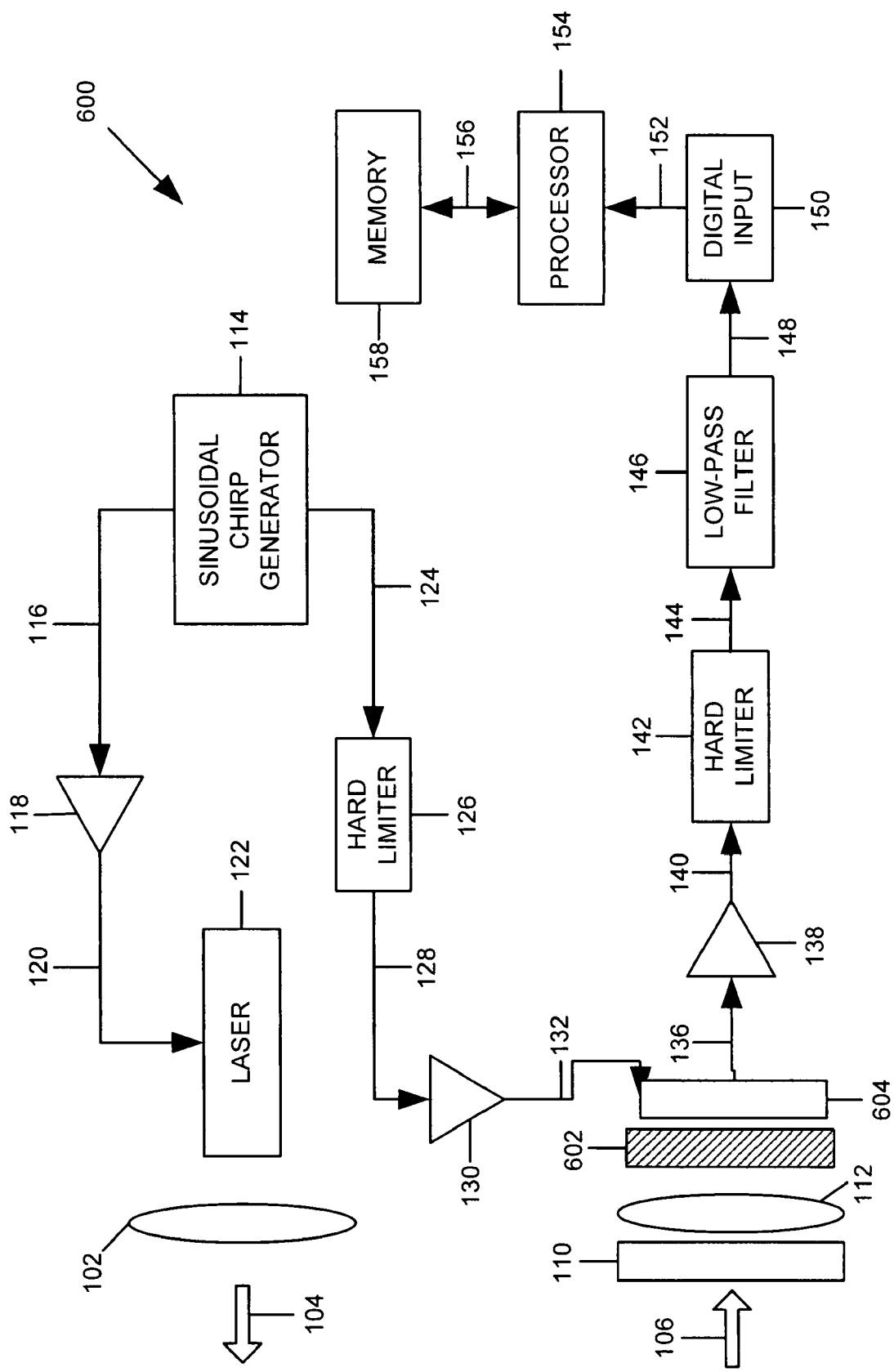
FIG. 6 is a block diagram of another embodiment of a photon counting chirped AM LADAR system.

FIG. 6 illustrates an alternative embodiment of a LADAR system 600. LADAR system 600 may be configured in much the same manner as LADAR system 100. As illustrated in FIG. 6, LADAR system 600 may further comprise a high-gain photon-to-electron or photon-to-electron-to-light conversion device 602 capable of single photon conversion to many electrons or to high light levels (e.g., MCP-based image intensifier tube, IPD, etc.) in combination with photonic mixing sensor 134, (e.g., metal-semiconductor-metal (MSM) opto-electronic (OE) mixing detectors). Photon conversion device 602 may be implemented in a number of configurations. For example, in one embodiment, photon conversion device 602 and photonic mixing sensor 134 are implemented in an electron-bombarded configuration. In an alternative embodiment, photon conversion device 602 and photonic mixing sensor 134 are implemented in a photon-to-electron-to-light conversion device, such as an image intensifier with a phosphor screen In this alternative configuration, the electrodes of photonic mixing sensor 134 may be driven by the chirped RF LO waveform to modulate its responsivity to the bombarding electrons or to the light emitted by the photon-to-electron-to-light conversion device. In this configuration, hard limiter 142 may be removed so that photonic mixing sensor 134 could be driven by a chirped sinusoidal LO, rather than by a chirped rectangular LO. Thereafter, similar signal conditioning and processing as described above with respect to FIG. 1 may be employed.

LADAR system 600 may be particularly useful when photon counting sensor 134 of FIG. 1 uses photo-electron amplification devices that require high bias voltages which may be difficult to gate on and off at the high frequencies and the large bandwidths of the modulation waveforms required to achieve high range resolution.

It should be emphasized that many variations and modifications may be made to the above-described embodiments. All such modifications and variations are intended to be included herein within the scope of this disclosure and protected by the following claims.

What is claimed is:

1. A ladar system comprising:
a chirp generator for generating a chirped waveform;
a laser for transmitting a light signal toward a target, the light signal being modulated by the chirped waveform;
a photon-counting sensor for receiving a temporally-modulated photon stream corresponding to the modulated light signal being reflected from the target and toward the ladar system, the photon-counting sensor being gated relative to the chirped waveform, wherein the photon-counting sensor is gated by a rectangular waveform having a frequency synchronized to the chirped waveform;
a hard limiter for receiving the chirped waveform and producing the rectangular waveform for gating the photon-counting sensor; and
wherein the photon-counting sensor mixes the temporally-modulated photon stream with a rectangular waveform having a frequency synchronized to the chirped waveform.

2. A ladar system comprising:
means for generating a chirped waveform;
means for transmitting a light signal toward a target, the light signal being modulated by the chirped waveform;
means for receiving a temporally-modulated photon stream corresponding to the modulated light signal being reflected from the target and toward the ladar system;
means for gating the receiving means relative to the chirped waveform;
means for mixing the temporally-modulated photon stream with a rectangular waveform having a frequency synchronized to the chirped waveform; and
means for producing a sinusoidal modulation of the temporal density of the received photon stream at an intermediate frequency between the frequency of the chirped waveform and the frequency of the photon arrival rate of the photon stream.

3. A method for performing laser detection and ranging, said method comprising:
modulating a light signal by a chirped waveform;
transmitting the light signal toward a target;
receiving a temporally-modulated photon stream corresponding to the modulated light signal being reflected from the target and toward the ladar system; and
determining an intermediate frequency between the chirped waveform and the temporally-modulated photon stream;
wherein the determining an intermediate frequency comprises gating a photon-counting sensor on and off relative to the chirped waveform;
wherein the determining an intermediate frequency comprises mixing the temporally-modulated photon stream with a rectangular waveform having a frequency synchronized to the chirped waveform; and
producing a sinusoidal modulation of the temporal density of the received photon stream at an intermediate frequency between the frequency of the chirped waveform and the frequency of the photon arrival rate of the photon stream.

* * * * *